(12) United States Patent
Matsushita et al.

(10) Patent No.: US 8,928,781 B2
(45) Date of Patent: Jan. 6, 2015

(54) RESPONSE FUNCTION DETERMINATION BY RANK MINIMIZATION

(75) Inventors: Yasuyuki Matsushita, Beijing (CN); Joon-Young Lee, Daejeon (KR)

(73) Assignee: Microsoft Corporation, Redmond, WA (US)

( * ) Notice: Subject to any disclaimer, the term of this patent is extended or adjusted under 35 U.S.C. 154(b) by 491 days.

(21) Appl. No.: 13/308,233

(22) Filed: Nov. 30, 2011

(65) Prior Publication Data

US 2013/0135489 A1 May 30, 2013

(51) Int. Cl.
 *H04N 5/217* (2011.01)
(52) U.S. Cl.
 USPC .......................................................... 348/241
(58) Field of Classification Search
 CPC ... H04N 5/232; H04N 5/335; H04N 5/23293; H04N 5/2352; H04N 5/235; H04N 5/243; H04N 5/2351; H04N 5/2355; H04N 5/361; H04N 5/3575; H04N 5/378
 USPC .................................... 348/221.1, 229.1, 241
 See application file for complete search history.

(56) References Cited

U.S. PATENT DOCUMENTS

| | | | |
|---|---|---|---|
| 4,663,591 A | 5/1987 | Pelc et al. | |
| 4,808,984 A | 2/1989 | Trueblood et al. | |
| 5,568,571 A | 10/1996 | Willis et al. | |
| 5,754,309 A | 5/1998 | Chen et al. | |
| 5,767,922 A | 6/1998 | Zabih et al. | |
| 5,832,140 A | 11/1998 | Stapleton et al. | |
| 6,009,437 A * | 12/1999 | Jacobs ................................. 1/1 | |
| 6,208,753 B1 | 3/2001 | Braudaway et al. | |
| 6,437,823 B1 | 8/2002 | Zhang | |
| 6,608,926 B1 | 8/2003 | Suwa et al. | |
| 6,639,594 B2 | 10/2003 | Zhang et al. | |
| 6,654,493 B1 | 11/2003 | Hilliard et al. | |
| 6,678,407 B1 | 1/2004 | Tajima | |
| 6,686,921 B1 | 2/2004 | Rushmeier et al. | |
| 6,825,884 B1 | 11/2004 | Horiuchi | |
| 7,054,485 B2 | 5/2006 | Li et al. | |
| 7,328,111 B2 | 2/2008 | Porikli | |
| 7,450,754 B2 | 11/2008 | Lin et al. | |

(Continued)

FOREIGN PATENT DOCUMENTS

| | | |
|---|---|---|
| EP | 0562971 | 9/1993 |
| EP | 1117070 | 7/2001 |

(Continued)

OTHER PUBLICATIONS

Barnard et al., "Camera Characterizaion for Colour Research," Colour research and Applications, vol. 27, No. 3, Jun. 2002, pp. 152-163.

(Continued)

*Primary Examiner* — Nicholas Giles
(74) *Attorney, Agent, or Firm* — Dan Choi; Judy Yee; Micky Minhas

(57) ABSTRACT

A response function of a device may be determined using rank minimization to transform a problem of determining a response function of the device into a framework of a rank minimization problem. A function is identified that minimizes a rank of an observation matrix which includes data of observations obtained by the device. This transformation may be used to determine a response function of the device under various conditions and to determine response functions of different devices in a unified framework.

20 Claims, 4 Drawing Sheets

(56) References Cited

U.S. PATENT DOCUMENTS

| | | | |
|---|---|---|---|
| 7,463,769 | B2 | 12/2008 | Lin et al. |
| 7,844,116 | B2* | 11/2010 | Monga ............................ 382/190 |
| 8,443,080 | B2* | 5/2013 | Ding et al. ..................... 709/224 |
| 8,699,773 | B2* | 4/2014 | Akcakaya et al. ............ 382/131 |
| 2004/0066388 | A1 | 4/2004 | Leather et al. |
| 2005/0104974 | A1 | 5/2005 | Watanabe et al. |
| 2005/0134599 | A1 | 6/2005 | Nayar et al. |
| 2005/0275736 | A1* | 12/2005 | Chiu et al. ..................... 348/272 |
| 2006/0092441 | A1* | 5/2006 | Quan et al. ..................... 358/1.9 |
| 2007/0139734 | A1* | 6/2007 | Fan et al. ....................... 358/504 |
| 2009/0080772 | A1 | 3/2009 | Lin et al. |
| 2009/0268062 | A1 | 10/2009 | Matsushita et al. |
| 2009/0303330 | A1 | 12/2009 | Matsushita et al. |
| 2010/0306290 | A1* | 12/2010 | Zhang et al. .................. 708/205 |
| 2011/0145262 | A1* | 6/2011 | Jamjoom et al. .............. 707/748 |
| 2011/0276682 | A1* | 11/2011 | Ding et al. ..................... 709/224 |
| 2012/0099774 | A1* | 4/2012 | Akcakaya et al. ............ 382/131 |

FOREIGN PATENT DOCUMENTS

| | | |
|---|---|---|
| JP | 07205412 | 8/1995 |
| JP | 07288698 | 10/1995 |
| JP | 09203664 | 8/1997 |
| JP | 10083445 | 3/1998 |
| WO | WO03025554 A2 | 3/2003 |

OTHER PUBLICATIONS

Bruegge et al, "MISR Prelaunch Instrument Calibration and Characterization Results," IEEE, Transactions on Geo Science and Remost Sensing, vol. 36, No. 4, Jul. 1998, pp. 1186-1198.

Campos, "Radiometric Calibration of Charge-Coupled-Device Video Cameras," Metrologia, vol. 37, No. 5, Oct. 2000, pp. 459-464.

Debevec et al., "Recovering High Dynamic Range Radiance Maps from Photographs," In Proc. of ACM SIGGRAPH, 1997, retrieved at <<http://yuwing.kaist.ac.kr/courses/CS770/reading/hdr-siggraph97.pdf>>, pp. 369-378.

Demircan, "Use of a Wide Angle CCD Line Camera for BRDF Measurements," Infrared Physics & Technology, vol. 41, No. 1, Feb. 2000, pp. 11-19.

Flynn et al, "Radiometric Calibration Procedures for a Wideband Infared Scene Projector (WISP)," SPIE, vol. 3697, Apr. 1999, pp. 265-273.

Grossberg et al., "Determining the Camera Response from Images: What is Knowable?" IEEE Trans. on Pattern Analysis and Machine Intelligence, vol. 25, No. 11, Nov. 2003, retrieved at <<http://ieeexplore.ieee.org/stamp/stamp.jsp?arnumber=01240119>>, 13 pages.

Grossberg et al., "What can be Known about the Radiometric Response from Images?" In Proc. of European Conf. on Comp. Vis. (ECCV), 2002, retrieved at <<http://www1.cs.columbia.edu/CAVE/publications/pdfs/Grossberg_ECCV02.pdf>>, pp. 189-205.

Grossberg et al., "What is the Space of Camera Response Functions?" In Proc. of Comp. Vis. and Pattern Rec. (CVPR), 2003, retrieved at <<http://www1.cs.columbia.edu/CAVE/publications/pdfs/Grossberg_CVPR03.pdf>>, pp. 602-609.

Translated Japanese Office Action mailed Jan. 18, 2011 for Japanese Patent Application No. 2005-83501, a counterpart application of US Patent No. 7,450,754, 2 pages.

Kim et al., "Joint Radiometric Calibration and Feature Tracking for an Adaptive Stereo System," Proceedings: Computer Vision and Image Understanding, Jan. 19, 2009, retrieved at <<http://www.cs.unc.edu/~gallup/papers/CVIU2010.pdf>>, pp. 574-582.

Kim et al., "Radiometric Alignment of Image Sequences," In Proc. of Comp. Vis. and Pattern Rec. (CVPR), 2004 retrieved at <<http://ieeexplore.ieee.org/stamp/stamp.jsp?tp=&arnumber=1315093>>, pp. 645-651.

Kim et al., "Robust Radiometric Calibration and Vignetting Correction," Proceedings: IEEE Transactions on Pattern Analysis and Machine Intelligence, vol. 30 Issue 4, Apr. 2008, retrieved at <<http://www.cs.unc.edu/~sjkim/papers/Kim_TPAMI08.pdf>>, pp. 562-576.

The Korean Office Action mailed Apr. 19, 2011 for Korean Patent Application No. 10-2005-23950, a counterpart foreign application of US Patent No. 7,450,754, 4 pages.

Lin et al., "Radiometric Calibration from a Single Image," Proc. of IEEE Conference on Computer Vision and Pattern Recognition. vol. 2, Jun. 27, 2004, pp. 938-945.

Lin et al., "Determining the Radiometric Response Function from a Single Grayscale Image," In Proc. of Comp.Vis. and Pattern Rec. (CVPR), 2005, retrieved at <<http://ieeexplore.ieee.org/stamp/stamp.jsp?tp=&arnumber=1467424>>, pp. 66-73.

Lin et al., "Radiometric Calibration from a Single Image," In Proc. of Comp. Vis. And Pattern Rec. (CVPR), 2004, retrieved at <<http://ieeexplore.ieee.org/stamp/stamp.jsp?tp=&arnumber=1315266>>, pp. 938-945.

Litvinov et al., "Addressing Radiometric Nonidealities: A Unified Framework," In Proc. of Comp. Vis.and Pattern Rec. (CVPR), 2005, retrieved at <<http://citeseerx.ist.psu.edu/viewdoc/download;jsessionid=7135A6FC5029455F1E2268A42201BAE7?doi=10.1.1.105.1183&rep=rep1&type=pdf>>, pp. 52-59.

Ma et al., "Fixed point and Bregman iterative methods for matrix rank minimization," Proceedings: arXiv:0905.1643, May 12, 2009, retrieved at <<http://arxiv.org/PS_cache/arxiv/pdf/0905/0905.1643v2.pdf>>, 27 pages.

Mann et al., "On being 'Undigital' with Digital Cameras: Extending Dynamic Range by Combining Differently Exposed Pictures," In Proc. of IS & T, 48th annual conference, May 7-11, 1995, retrieved at <<http://citeseerx.ist.psu.edu/viewdoc/download?doi=10.1.1.49.1521&rep=rep1&type=pdf>>, pp. 422-728.

Mann, "Quantigraphic Imaging: Estimating the camera response and exposures from differently exposed images," In Proc. of Comp. Vis. and Pattern Rec. (CVPR), pp. 842-849, 2001.

Matsushita et al., "Radiometric Calibration from Noise Distributions," In Proc. of Comp. Vis. and Pattern Rec. (CVPR), 2007, retrieved at <<http://citeseerx.ist.psu.edu/viewdoc/download?doi=10.1.1.90.5625&rep=rep1&type=pdf>>, pp. 1-8.

Mermelstein et al, "Spectral and Radiometric Calibration of Midwave and Longwave Infrared Cameras," Society of Photo-Optical Instrumentation Engineers, Feb. 2000, pp. 347-352.

Mitsunaga et al, "Radiometric Self Calibration," IEEE, Computer Vision and Pattern Recognition, vol. 1, Jun. 23-25, 1999, pp. 1-8.

Mitsunaga et al., "Radiometric Self-calibration," In Proc. of Comp. Vis. and Pattern Rec. (CVPR), 1999, retrieved at <<https://www.cs.drexel.edu/~kon/advcompvis/papers/Mitsunaga_CVPR99.pdf>>, pp. 374-380.

Nayar et al, "High Dynamic Range Imaging: Spatially Varying Pixel Exposures," Proceedings of IEEE Conference on Computer Vision and Pattern Recognition, Jun. 2000, pp. 1-9.

Nelder et al., "A Simplex Method for Function Minimization," Computer Journal, 7:308-313, retrieved at <<http://www.duke.edu/~hpgavin/ce130/Nelder+Mead-ComputerJournal-1965.pdf>>, 1965, 6 pages.

Pal et al., "Probability Models for High Dynamic Range Imaging," In Proc. of Comp. Vis. and Pattern Rec. (CVPR), 2004, retrieved at <<http://www.professeurs.polymtl.ca/christopher.pal/cvpr04/cvprhdr.pdf>>, pp. 173-180.

Pauquet, "Bayesian Estimation," Bayesian Estimation Web, Oct. 2002, pp. 1-8.

"Radiometric Camera Calibration," Proceedings: Columbia University, retrieved Aug. 25, 2011 at <<http://www.cs.columbia.edu/CAVE/projects/rad_cal/>>, 3 pages.

Rasmussen, "The Infinite Gaussian Mixture Model," MIT Press, 2000, pp. 554-560.

Shi et al., "Self-Calibrating Photometric Stereo," In Proc. of Comp. Vis. And Pattern Rec. (CVPR), 2010, retrieved at <<http://www.ece.nus.edu.sg/stfpage/eletp/Papers/cvpr10.pdf>>, pp. 1118-1125.

(56) References Cited

OTHER PUBLICATIONS

Singh et al, "Exploiting Spatial and Spectral Image Regularities for Color Constancy," MIT Computer Science and Artificial Intelligence Laboratory, Jul. 2003, pp. 1-19.

Takamatsu et al., "Estimating Camera Response Functions using Probabilistic Intensity Similarity," In Proc. of Comp. Vis. and Pattern Rec. (CVPR), 2008, retrieved at <<http://robotics.naist.jp/~j-taka/j-taka_CVPR2008.pdf>>, pp. 1-8.

Tsin et al., "Statistical Calibration of CCD Imaging Process," In Proc. of Int'l Conf. on Comp. Vis. (ICCV), 2001, retrieved at <<http://ieeexplore.ieee.org/stamp/stamp.jsp?tp=&arnumber=937555>>, pp. 480-487.

Wright et al., "Robust Principal Component Analysis: Exact Recovery of Corrupted Low-rank Matrices by Convex Optimization," In proceedings of Neural Information Processing Systems (NIPS), Dec. 2009, retrieved at <<http://perception.csl.uiuc.edu/matrix-rank/Files/nips2009.pdf>>, 9 pages.

The Korean Office Action mailed Feb. 29, 2012 for Korean patent application No. 10-2005-23950, a counterpart foreign application of US patent No. 7,450,754, English summary included, 5 pages.

The Korean Office Action mailed Jun. 8, 2012 for Korean patent application No. 10-2005-23950, a counterpart foreign application of US patent No. 7,450,754, English summary included, 7 pages.

\* cited by examiner

RESPONSE FUNCTION DETERMINATION BY RANK MINIMIZATION

BACKGROUND

A response function describes a relationship between inputs and outputs of a device. For example, a radiometric response function of an optical device, such as a camera, relates irradiance received by the optical device to a brightness of an image obtained thereby. Given a set of input data and corresponding output data of a device, a response function thereof may be determined by finding a function that will fit or best fit the given set of the input and output data. Based on the determined response function, the inputs of the device may be reconstructed from respective outputs. For example, information of distribution of light intensities entering a camera may be reconstructed from pixel intensities of an image based on a determined response function of the camera.

Information of this set of input and output data, however, may not always be available for every device in every scenario. For example, amounts of sensor irradiance to a camera are normally unavailable in most scenarios. Nevertheless, a radiometric response function of a camera is normally made to be nonlinear for purposes such as compressing a dynamic range of sensor irradiance and/or adapting to a non-linear mapping of a display. This nonlinearity, if not accounted for however, may create problems in computer vision applications, especially when a linear relationship between sensor irradiance and recorded intensity of the camera is erroneously assumed. Therefore, radiometric calibration has become important for those computer vision applications that assume a linear relationship between sensor irradiance and recorded intensity.

Although a variety of algorithms have been proposed for determining a response function, for example, calibrating a radiometric response function of a camera, these algorithms are ad hoc in nature and fail to provide a unified framework for determining the response function.

SUMMARY

This summary introduces simplified concepts of response function determination, which is further described below in the Detailed Description. This summary is not intended to identify essential features of the claimed subject matter, nor is it intended for use in limiting the scope of the claimed subject matter.

This application describes example embodiments of response function determination. In one embodiment, a request for determining a response function of a device, such as a camera or other image capture device, may be received. In response to receiving the request, a problem of determining the response function of the device may be transformed into a framework of a rank minimization problem. The response function of the device may be determined based on the framework of the rank minimization problem.

In some embodiments, input data that is obtained by a device under a predetermined condition may be received. In response to receiving the input data, a response function of the device may be determined within a framework of a rank minimization problem based on the received input data.

In some embodiments, a request to determine a radiometric response function of an optical device may be received. In one embodiment, one or more images that are obtained by the optical device under a predetermined condition may further be received. Upon receiving the one or more images, intensity values of each image may be arranged into an observation matrix. In some embodiments, an inverse function that, when applying on the observation matrix, transforms the observation matrix into a matrix having a rank of one or a minimal rank, may then be determined, and the radiometric response function of the device may be determined based on the inverse function that minimizes the rank of the observation matrix.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
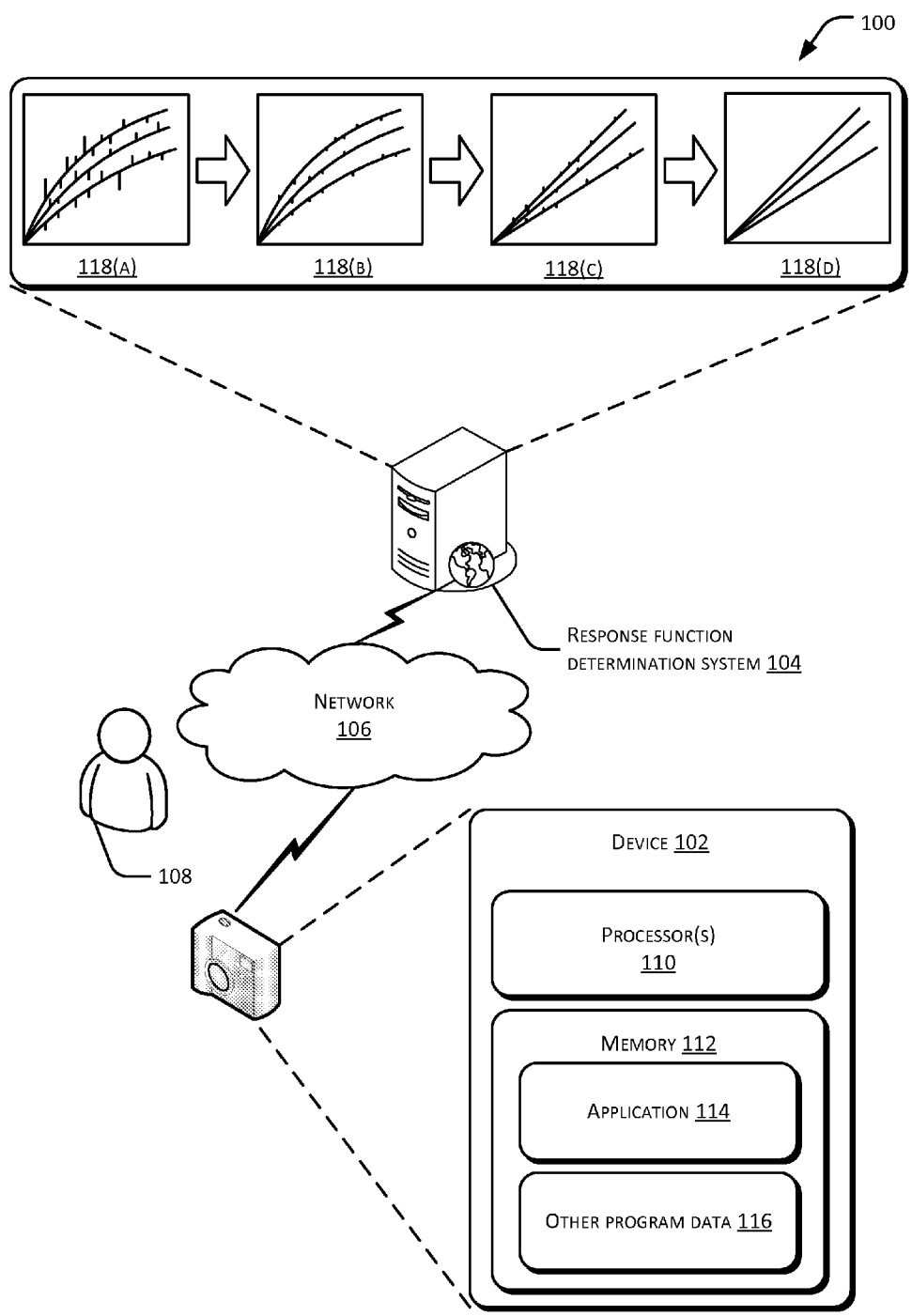
FIG. 1 illustrates an example environment including an example response function determination system.

As noted above, existing technologies fail to provide a unified framework for determination or calibration of a response function of a device. This is especially true when input data of the device is unavailable or limited.

This disclosure describes a response function determination system, which determines a response function of a device in a unified framework.

Generally, the response function determination system determines or calibrates a response function of a device within a framework of a rank minimization problem. Specifically, the system transforms a problem of determining or calibrating the response function of the device into a problem of recovering a low-rank structure.

In one embodiment, the system may receive a plurality of outputs or observations from a device of which a response function is to be determined. The device may include, for example, an optical device (e.g., still camera, video camera, or other image capture device), an electronic device, a biochemical device, a chemical device, etc. The system may receive the plurality of outputs or observations obtained under a predetermined condition. For example, the system may receive outputs or observations of the device corresponding to inputs of varying magnitudes to the device. In one embodiment, the system may not know the absolute or relative magnitudes of these inputs. In another embodiment, the system may know an absolute magnitude of at most one input or at most one ratio between any two inputs. In other embodiments, the system may know some or all of the absolute or relative magnitudes of the inputs.

In response to receiving the outputs or observations of the device, the system may transform or arrange data of the outputs or observations in a form that allows rank determination. Generally, rank determination in this context is to determine a rank of a matrix or a tensor. For example, in one embodiment, the system may transform or arrange the data of the outputs or observations in a matrix or tensor form. Additionally, the system may arrange the data of the outputs or observations in a way that the data of the outputs exhibits a linear dependence with each other when transformed by an inverse function that corresponds to the response function to be determined.

In response to transforming or arranging the data of the outputs or observations in a designated form (e.g., a matrix form), the system may find an inverse function that, when applied to the matrix, minimizes a rank of the matrix, for example.

Upon finding the inverse function that minimizes the rank of the matrix, for example, the system may obtain the response function of the device based on the found inverse function. By way of example and not limitation, the system may recover the response function of the device from the found inverse function based on, for example, properties of monotonicity and continuity of the response function of the device.

The described system allows determining a response function of a device. By transforming a problem of determining a response function into a problem of recovering a low-rank structure, the described system provides a unified framework of determining the response function of the device under various conditions.

While in the examples described herein, the response function determination system obtains outputs of a device, transforms data of the outputs in a designated form, determines an inverse function, and obtains a response function of the device, in other embodiments, these functions may be performed by multiple separate systems or services. For example, in one embodiment, a transformation service may transform data of the outputs of the device into a designated form, while a separate service may determine an inverse function that transforms and minimizes a rank of the designated form, and yet another service may obtain a response function based on the found inverse function.

The application describes multiple and varied implementations and embodiments. The following section describes an example environment that is suitable for practicing various implementations. Next, the application describes example systems, devices, and processes for implementing a response function determination system.

Exemplary Environment

FIG. 1 illustrates an exemplary environment 100 usable to implement a response function determination system. The environment 100 includes a device 102 and a response function determination system 104.

The device 102 may be implemented as any of a variety of conventional devices (e.g., still camera, video camera or other image capture device) for which response functions need to be determined. The device 102 may include an optical device, an electronic device, a biochemical device, a chemical device, etc.

In one embodiment, the environment 100 may further include a network 106. The device 102 may communicate data with the response function determination system 104 through the network 106.

The network 106 may be a wireless or a wired network, or a combination thereof. The network 106 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless or wired networks, or a combination thereof. In one embodiment, the network 106 may include a near field communication channel. Examples of a near field communication channel include, but are not limited to, infrared communication, radio-frequency identification (RFID), Bluetooth, WiFi, WiFi connect, ZigBee, infrared data association (IrDA), high-frequency modulated visible light and/or modulated audio.

Additionally or alternatively, the device 102 may communicate the data with the response function determination system 104 out of the network 106. For example, the environment 100 may further include a user 108 who enters the data of the device 102 into the response function determination system 104, possibly through an input means such as an image capture device (e.g., camera or scanner), a mouse, and/or a keyboard (not shown) of the response function determination system 104. Additionally or alternatively, the user 108 may connect a removable or portable memory device (not shown) to the device 102 and transfer the data from the device 102 to the memory device. The user 108 may then detach the memory device and connect the memory device to the response function determination system 104 to transfer the data thereto.

In one embodiment, the device 102 includes a processor 110 coupled to memory 112. The memory 112 includes one or more applications 114 (e.g., a storage application, an operating system, etc.) and other program data 116. The memory 112 may be coupled to or associated with, and/or accessible to other devices, such as network servers, routers, and/or other client devices 102.

The user 108 may want to determine a response function of the device 102. Depending on connection capability of the device 102, the user 108 may provide data useful for determining the response function of the device 102 to the response function determination system 104 through the network 106 and/or out of the network 106.

In response to receiving the data, the response function determination system 104 may perform one or more operations to determine the response function of the device 102 or recover original inputs of the device 102. For example, the response function determination system 104 may eliminate outliers from the received data 118($a$) to generate pre-processed data 118($b$) using outlier rejection. Additionally, the response function determination system 104 may determine an inverse function to reconstruct approximate inputs (possibly with noise) 118($c$) of the device 102 from the pre-processed data 118($b$) using rank minimization. Optionally, the response function determination system 104 may further eliminate possible noise from the reconstructed inputs 118($c$) to recover original inputs 118($d$) of the device 102 that correspond to the received data 118($a$). For example, in one embodiment, the response function determination system 104 may recover the original inputs 118($d$) of the device 102 from the reconstructed inputs 118($c$) using a rank-one constraint of the reconstructed inputs 118($c$).

Figure 2:
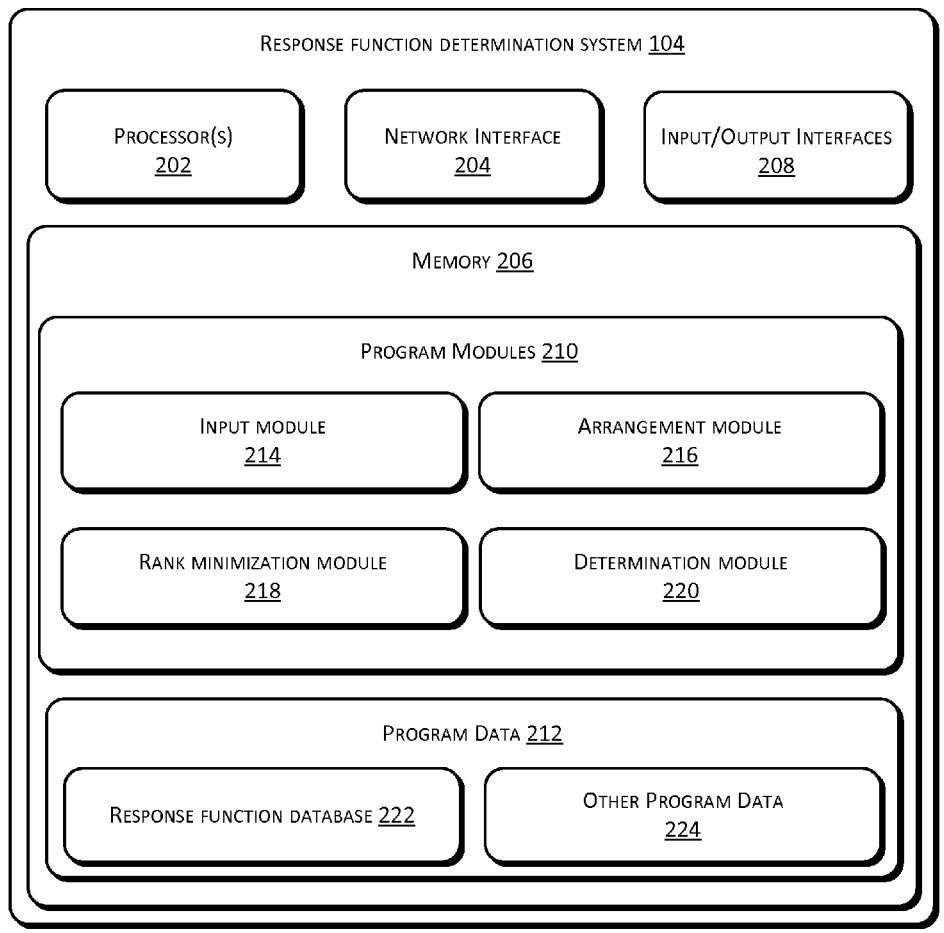
FIG. 2 illustrates the example response function determination system of FIG. 1 in more detail.

FIG. 2 illustrates the response function determination system 104 in more detail. In one embodiment, the system 104 can include, but is not limited to, one or more processors 202, a network interface 204, memory 206, and an input/output interface 208. The processor 202 is configured to execute instructions received from the network interface 204, received from the input/output interface 208, and stored in the memory 206.

The memory 206 may include computer-readable media in the form of volatile memory, such as Random Access Memory (RAM) and/or non-volatile memory, such as read only memory (ROM) or flash RAM. The memory 206 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The memory 206 may include program modules 210 and program data 212. In one embodiment, the response function determination system 104 may include an input module 214. The response function determination system 104 may receive data of the device 102 from the device 102 or from the user 108 through the input module 214. The data of the device 102 may include, but is not limited to, observations obtained by the device 102 in response to receiving stimuli or inputs to the device 102 under a predetermined condition. The stimuli or inputs to the device 102 may include, for example, light or color intensities, magnitudes of electrical currents or voltages, number of chemical molecules, etc., depending on the type (e.g., optical, electronic, chemical, etc.) of the device 102.

By way of example and not limitation, the predetermined condition may include, for example, varying intensities of the stimulus or inputs to the device 102. In one embodiment, the varying intensities of the stimuli or the inputs or ratios of the varying intensities among the stimuli or the inputs may be known. For example, an optical device such as a camera may be used to capture a scene which is illuminated by a light source (not shown). Intensity of the light source may be controlled by the user 108 and/or the system 104 and is varied by a known amount.

In another embodiment, the varying intensities of the stimuli or the inputs may be unknown. In some embodiments, only some of the intensities of the stimuli or the inputs and/or ratios between the intensities of the stimuli or the inputs may be known. For example, in one embodiment, at most one ratio between intensities of two stimuli or inputs is known.

In one embodiment, the input module 214 may receive data from the device 102 or another device (not shown) having the data of the device 102 through the network 106. Additionally or alternatively, the input module 214 may provide an input means such as a camera or scanner (not shown) to allow the user 108 to enter the data of the device 102. Additionally or alternatively, the input module 214 may accept the data of the device 102 through a removable memory device such as a USB (universal serial bus) drive, a SD (secure digital) card, etc., that includes the data of the device 102.

In response to receiving the data of the device 102, the response function determination system 104 may arrange the data of the device 102 into a format that allows transformation or casting of the data of the device 102 within a framework of a rank minimization problem. In one embodiment, the response function determination system 104 may include an arrangement module 216 that arranges the data of the device 102 in such a way that transforms or casts a problem of determining the response function of the device 102 into a framework of a rank minimization problem. By way of example and not limitation, the arrangement module 216 may arrange the data (i.e., the observations obtained by the device 102 in response to receiving the stimuli or the inputs) in a way that the arranged data will exhibit a linear dependence if being transformed by an inverse function that is associated with the response function of the device 102 to be determined.

Additionally or alternatively, the arrangement module 216 may explore linearity in the stimuli or the inputs of the device 102 and formulate the problem of determining the response function of the device as a rank minimization problem. For example, the arrangement module 216 may receive the observations obtained by the device 102 and transform the data of the observations into a matrix, a tensor or the like. In one embodiment, the arrangement module 216 may transform or input each observation into a column or a row of an observation matrix.

Additionally, the rank minimization module 218 may further select a representation of the response function to be determined. The rank minimization module 218 may represent the response function to be determined in any conventional form. By way of example and not limitation, the rank minimization module 218 may employ an empirical model of response function (EMoR) to represent the response function to be determined. EMoR is a highly non-smooth function and may be suitable for determining a response function that may be non-smooth. Details of EMoR may be found in M. Grossberg and S. K. Nayar, "Modelling the Space of Camera Response Functions," *IEEE Transactions on Pattern Analysis and Machine Intelligence*, vol. 26, no. 10, pp. 1272-1282, 2004.

Additionally or alternatively, the rank minimization module 218 may employ a polynomial representation to represent the response function to be determined. The polynomial representation is appropriate for gradient-based convex optimization because of corresponding inherent smoothness. Details of polynomial representation of the response function can be found in T. Mitsunaga and S. K. Nayar, "Radiometric Self Calibration," in *Proceedings of IEEE Conference on Computer Vision and Pattern Recognition (CVPR)*, 1999, pp. 374-380.

In response to arranging the observations of the device 102, for example, into an observation matrix D, the response function determination system 104 may further include a rank minimization module 218 that determines an inverse function g that transforms the observation matrix D into a matrix A of rank one or a matrix having a minimal rank. Specifically, the rank minimization module 218 determines an inverse function ĝ based on the following objection function:

$$\hat{g} = \mathrm{argmin}_g \mathrm{rank}(A) \text{ s.t. } A = g \circ D \quad (1)$$

where ∘ represents an operator that describes element-wise mapping between g and D.

The rank minimization module 218 may employ any conventional method to determine the inverse function. By way of example and not limitation, the rank minimization module 218 may use an approximate solution method that minimizes a nuclear norm, which is defined as a sum of singular values of a transformed matrix, i.e., a sum of diagonal entries of the transformed matrix. The transformed matrix is a matrix transformed by an inverse function by applying the inverse function to the observation matrix. The rank minimization module 218 may employ this approximate solution method to find an inverse function which, when applied to the observation matrix, does not alter magnitudes of matrix elements of the observation matrix.

In another embodiment, if the inverse function determined by the rank minimization module 218 is allowed to alter or significantly alter absolute values of the matrix elements of the observation matrix, the rank minimization module 218 may use condition numbers instead. A condition number is defined as a ratio between two singular values of a matrix. In one embodiment, the rank minimization module 218 may select some or all condition numbers and determine an inverse function that minimizes a sum of the selected condition numbers of a transformed matrix transformed thereby.

Additionally or alternatively, the rank minimization module 218 may further apply one or more heuristic constraints when determining an inverse function in order to avoid obtaining a trivial solution for the rank minimization problem. By way of example and not limitation, the rank minimization module 218 may further include a monotonicity constraint into the objective function as described above. In one embodiment, the rank minimization module 218 may, for example, represent the monotonicity constraint as $\partial g/\partial D > 0$, and rewrite the objection function as:

$$\hat{g} = \operatorname{argmin}_g \operatorname{rank}(A) + \lambda \sum_t H\left(\frac{\partial g(t)}{\partial D}\right) \quad (2)$$

$$\text{s.t. } A = g \circ D$$

where $H(\cdot)$ is a Heaviside step function ($H(x)=1$ when $x \geq 0$, and $H(x)=0$, otherwise). $\hat{g}$ represents a desired inverse function that transforms the observation matrix D into a matrix A of rank one or a matrix having a minimal rank. The rank minimization module 218 may assess the derivatives $\partial g(t)/\partial D$ at various t within a range of [0, 1], for example.

Although Heaviside step function is described to be used for representing the monotonicity constraint in the objection function, the rank minimization module 218 may use any other function that may represent and/or enforce monotonicity in the inverse function to be determined.

Additionally or alternatively, prior to determining the inverse function that transforms the observation matrix into a matrix of rank-one or minimal rank, the rank minimization module 218 may further eliminate outliers in the received data of observations or in the observation matrix. The outliers may be present in the received observations or the observation matrix because of noise, systematic discrepancies, etc. In one embodiment, the rank minimization module 218 may employ any conventional filtering method such as a low pass filter to remove any high-frequency noise in the received data of observations. In some embodiments, the rank minimization module 218 may employ a method based on robust PCA (Principal Component Analysis) algorithm for reliably eliminating the outliers in the data of observations. In one embodiment, the rank minimization module 218 may decompose the observation matrix D into two matrices:

$$D = Z + S \quad (3)$$

where Z is a low-rank matrix and S is a sparse error matrix.

The rank minimization module 218 may obtain a solution of the above equation (3) by solving minimize $\|Z\| + \lambda_S \|S\|$ subject to $Z + S = D$ (4)

where $\lambda_S$ is a regularization weight.

In some embodiments, the rank minimization module 218 may further modify the above robust PCA algorithm to take into account of a low-rank (e.g., rank-one) structure of the observation matrix and/or a low-frequency nature of the response function to be determined. By way of example and not limitation, the rank minimization module 218 may decompose the observation matrix into a rank-one matrix and a high-rank matrix, and apply a threshold to the high-rank matrix to find the outliers. In one embodiment, the rank minimization module 218 may find the outliers based on statistics of the high-rank matrix. The rank minimization module 218 may calculate the statistics of the high-rank matrix based on a predetermined distribution of rank deviations from a rank-one approximation. The predetermined distribution may include, for example, a Gaussian distribution, a normal distribution, etc.

By way of example and not limitation, the rank minimization module 218 may employ an outlier rejection algorithm as described in Table 1 as follows. In Table 1, R is a rank-one matrix, H is a high-rank matrix, $\sigma_i$ is an $i^{th}$ singular value, $u_i$ and $v_i$ are $i^{th}$ columns of U and V respectively, and $\Psi$ is a thresholding operator which is defined as:

$$\Psi_\rho[h_i] = \begin{cases} h_i & \text{if } |h_i - \mu_H| > \epsilon + \rho s_H \\ 0 & \text{otherwise} \end{cases} \quad (5)$$

where $\epsilon$ is a predetermined small epsilon value, $\mu_H$ and $s_H$ are mean and standard deviation of the high-rank matrix H respectively. $\Sigma_n$ is a diagonal matrix having singular values of $Z_k$ on its diagonal. In one embodiment, $\Sigma_n$ may be formed, for example, by replacing the singular values with zeros except first n largest singular values on the diagonal of $\Sigma$. $\Sigma_1$ therefore corresponds to a diagonal matrix having only one nonzero diagonal value which corresponds to the largest singular value of $Z_k$.

TABLE 1

Outlier Rejection Algorithm
Outlier Rejection Algorithm

1: Procedure OutlierRejection (X, ρ)
2:    $Z_0 = X$
3:    while not converged do
4:      $(U, \Sigma, V) = \text{svd}(Z_k)$
5:      $R = U\Sigma_1 V^T = \sigma_1 u_1 v_1^T$
6:      $H = Z_k - R$
7:      $dE = \Psi_\rho[H]$
8:      $Z_{k+1} = Z_k - dE$
9:    end while
10:    return $Z_{k+1}$
11: end procedure In one embodiment, the rank minimization module 218 may apply this thresholding operator $\Psi$ to each element of the matrices (e.g., the high-rank matrix). Additionally or alternatively, in some embodiments, the rank minimization module 218 may only keep components associated with outliers which are outside p standard deviations to be remained in the high-rank matrix H.

Additionally, in response to determining the inverse function by the rank minimization module 218, the response function determination system 104 may further include a determination module 220 to determine the response function of the device 102 from the determined inverse function. In one embodiment, the determination module 220 may determine the response function of the device 102 from the determined inverse function based on certain properties of the response function. By way of example and not limitation, the determination module 220 may determine the response function of the device 102 from the determined inverse function based on properties of monotonicity and/or continuity of the response function. For example, based on the property of continuity of the response function, one-to-one correspondence mapping exists between the determined inverse function and the response function of the device 102. The response function of the device 102 may then be determined by inversing the determined inverse function using any conventional method such as inverse transformation method, etc.

Upon determining the response function of the device 102, the response function determination system 104 may provide a result to the user 108 through an output module 222. In one embodiment, the output module 222 may display the determined response function in a graphical form to the user 108 through a display directly or indirectly connected to the response function determination system 104 (e.g., through the network 106). Additionally or alternatively, the output module 222 may output the result (in a graphical and/or tabular form) to a removable storage device such as USB drive and allow the user 108 to print through a printer or display the result through a display of a different device.

Optionally, the response function determination system 104 may further include a response function database 222 to store the determined response function of the device 102. In one embodiment, the response function database 222 may store the determined response function of the device 102 along with an identity and/or a model (type or number, for example) of the device 102 to facilitate retrieval of the response function of the device 102, for example, based on respective identity or model of the device 102. In some embodiments, the response function database 222 may be a central repository that is separate from the response function determination system 104, but communicatively connected to the response function determination system 104 through a network such as the network 106.

Optionally, the response function determination system 104 may further include other program data 224 which stores log data of the data of observations received from the device 102. This may allow refined determination of the response function of the device 102 when further data of observations are obtained in the future.

Example Application

One example of determining or calibrating a radiometric response function of an optical device such as a camera is given herein for illustration purpose only. Any other applications of determining a response function of a device may employ some or all of the algorithms described hereinafter. Additional details of determining a radiometric response function of an optical device that implements the disclosed method and system of the present disclosure may be found in Joon-Young Lee, Boxin Shi, Yasuyuki Matsushita, In-So Kweon and Katsushi Ikeuchi, "Radiometric Calibration by Transform Invariant Low-rank Structure," in *Proceedings of IEEE Conference on Computer Vision and Pattern Recognition (CVPR)*, June 2011, pp 2337-2344, and Joon-Young Lee, Yasuyuki Matsushita, Boxin Shi, In-So Kweon and Katsushi Ikeuchi, "Radiometric Calibration by Rank Minimization," submitted to *IEEE Transactions on Pattern Analysis and Machine Intelligence (PAMI)*, August 2011. Further, these two journal papers are further incorporated by reference herein.

For example, the response function determination system 104 may receive, through the input module 214, data of observations from an optical device of which a radiometric response function is to be determined. In one embodiment, the observations of the optical device may be obtained in a predetermined condition. The predetermined condition may include, for example, capturing one or more images each with a different known or unknown exposure time, capturing one or more images each with a different known or unknown degree of illumination, and/or capturing one or more images that include irradiance mixtures around one or more edges of respective images.

In one embodiment, the response function determination system 104 may formulate this problem of determining the radiometric response function of the optical device as a rank minimization problem. For example, the response function determination system 104 may use linearity in sensor irradiance to formulate the rank minimization problem.

By way of example and not limitation, the arrangement module 216 of the response function determination system 104 may arrange or input the data of observations received from the optical device into an observation matrix. For example, the response function determination system 104 may receive the data of observations in a form of a set of observation vectors $\{vec(M_1), \ldots, M_n)\}$. Each of these observation vectors is defined as a vector of measured intensities $vec(M_i) \in \mathbb{R}^{m \times 1}$, where $i=1, \ldots, n$. The numbers m and n represent the number of elements in each observation vector $vec(M_i)$ and the number of observation vectors respectively. In response to receiving this set of observation vectors arrangement module 216 may create an observation matrix $D \in \mathbb{R}^{m \times n}$ by stacking the received observation vectors $vec(M_i)$ as follows:

$$D = [vec(M_1) | \ldots | vec(M_n)] \quad (6)$$

Given an inverse function g that corresponds to the radiometric response function $f$ of the optical device where $g = f^{-1}$, the observation matrix D may be transformed into an irradiance matrix A with a scaling ambiguity by:

$$g \circ D = A = [vec(I_1) | \ldots | vec(I_n)] \quad (7)$$

where $\circ$ is an operator that describes an element-wise mapping, and $vec(I_i) \in \mathbb{R}^{m \times 1}$ represents an irradiance vector.

If irradiance vectors $vec(I_i)$ are linearly dependent, the irradiance matrix will have a rank of one. The response function determination system 104 therefore formulates the problem of determining or calibrating the radiometric response function of the optical device into a problem of determining an inverse function g that minimizes the rank of the transformed matrix $g \circ D (= A)$:

$$\hat{g} = \operatorname{argmin}_g \operatorname{rank}(A) \text{ s.t. } A = g \circ D \quad (8)$$

The above obtained formulation (i.e., Equation (8)) is general and therefore capable of treating various types of observation vectors in a unified framework. Additionally or alternatively, the arrangement module 216 may further arrange the observation vectors $vec(M_i)$ in a way that the observation vectors $vec(M_i)$ exhibit a linear dependence when transformed by a correct or best inverse function g.

Before describing how to determine or calibrate using this unified framework, a brief description is given of how to apply this unified framework to different types of observation vectors obtained under different predetermined conditions.

In one embodiment, the response function determination system 104 may receive a set of observation vectors that correspond to a plurality of images of a static scene obtained from the optical device (e.g., a camera) with various exposures. Because scene radiance L is constant, the sensor irradiance I becomes proportional to an exposure time e as:

$$I = kL \propto e \quad (9)$$

with a constant scaling k.

For each exposure, the response function determination system 104 may create an observation vector vec($M_i$) by, for example, vectorizing a respective image of m pixels, e.g., by arranging recorded intensities in a scanline order. Given n different exposures, the response function determination system 104 (i.e., the arrangement module 216) may create an observation matrix D by stacking n observation vectors as in Equation (6). Since the sensor irradiance vec($I_i$) is proportional to the exposure time as described in Equation (9), the rank minimization formulation (as described in Equation (8)) may be directly used in this condition, i.e., finding an inverse response function g that best minimizes a rank of a transformed observation matrix g∘D.

Additionally or alternatively, in another embodiment, the response function determination system 104 may receive a set of observation vectors that correspond to a plurality of images obtained by the optical device under varying degrees of illumination. Given the plurality of images captured under n different lighting conditions (e.g., n different degrees of illuminations), the arrangement module 216 creates a color profile matrix D=$\mathbb{R}^{3 \times n}$ from each pixel location of the images. A color profile is defined as an ordered set of color values in a RGB (red-green-blue) space. The number of matrix rows corresponds to the number of color channels (RBG). For each of m pixels, the arrangement module 216 may obtain $D_i$, i=1, . . . , m. Considering all of the m pixels, the arrangement module 218 may obtain an objective function $\hat{g}$ written as:

$$\hat{g} = \mathrm{argmin}_g \Sigma_{i=1}^m \mathrm{rank}(A_i) \text{ s.t. } A_i = g \circ D_i \quad (10)$$

The response function determination system 104 (or the rank minimization module 218) may determine or find a single global inverse function g that minimizes ranks of all the color profile matrices $D_i$.

Additionally or alternatively, in some embodiments, the response function determination system 104 may receive a set of observation vectors that have corresponding color/irradiance mixtures in one or more images obtained by the optical device. To apply the rank minimization approach as described herein, the response function determination system 104 (or the arrangement module 216) may translate a color mixture profile of a color/irradiance mixture of the one or more images to allow the color/irradiance mixture to pass through an origin of a RGB space by, for example, simply subtracting RGB value of either color from the color mixture profile. Upon translating the color mixture profile, the arrangement module 216 may perform operations similar to those described above with respect to receiving a set of observation vectors that are obtained under varying degrees of illumination to formulate the problem of determining the response function of the optical device into a rank minimization problem.

Additionally, the response function determination system 104 may further determine a suitable or best representation of the response function of the optical device. In one embodiment, the rank minimization module 218 may select a polynomial representation to represent the response function to be determined because of corresponding nature of smoothness for ease of applying a gradient-based convex optimization. Additionally, the rank minimization module 218 may further normalize irradiance and observation domains in a range of [0, 1] by enforcing g(0)=0 and g(1)=1, for example. In one embodiment, the rank minimization module 218 may explicitly embed these boundary conditions in a parametric representation of g, and in this case the polynomial representation of g becomes:

$$g(M) = M + M(M-1)\Sigma_{i=1}^{n-1} c_i M^{n-i-1} \quad (11)$$

where n is a predetermined order of a polynomial function, and $c_i$ are coefficients to be estimated. By way of example and not limitation, the rank minimization module 218 may set the predetermined order of a polynomial function to a certain value (e.g., 5) automatically or upon request by the user 108.

Upon determining a representation for representing the response function to be determined, the rank minimization module 218 may solve the rank minimization problem to find an inverse function as described above. In one embodiment, the rank minimization module 218 may employ an approximate solution method that minimizes a nuclear norm which is defined as a sum of singular values $\|A\|_* \equiv \Sigma_{i=1}^n \sigma_i(A)$. In order to avoid obtaining a possible degenerate solution where an inverse function g tries to turn matrix elements into zero to produce smaller singular values when directly applying the nuclear norm minimization, in some embodiments, the rank minimization module 218 may use condition numbers $\kappa_i$, i.e., a ratio of singular values, instead of absolute singular values. In one embodiment, the condition numbers may be defined as:

$$\kappa_i(A) \equiv \sigma_i(A)/\sigma_1(A) \ i=2, 3, \ldots, n \quad (12)$$

With the condition numbers $\kappa_i$, the rank minimization module 218 works with relative magnitudes of the singular values that are unaffected by corresponding absolute magnitudes. Therefore, the rank minimization module 218 may approximate the objective function (or an energy functional) as described in Equation (8) as a minimization of a sum of the condition numbers as follows:

$$\hat{g} = \mathrm{argmin}_g \Sigma_{i=2}^n \kappa_i(A) \text{ s.t. } A = g \circ D \quad (13)$$

In one embodiment, in order to reduce effects of noise in the images or observation matrix (e.g., effects of high-frequency noise in the images on higher condition numbers), the rank minimization module 218 may alternatively use a subset (i.e., less than all) of the condition numbers in determining a best inverse function as described in Equation (13). By way of example and not limitation, the rank minimization module 218 may select condition number $\kappa_2$ only, and the objective function may be simplified as:

$$\hat{g} = \mathrm{argmin}_g \kappa_2(A) \text{ s.t. } A = g \circ D \quad (14)$$

The rank minimization module 218 may use this simplified objective function to find a best rank-one matrix in the presence of noise that is or is not sparse in nature. In other words, the rank minimization module 218 may explicitly employ the prior knowledge of a rank-one structure for efficiently solving the rank minimization problem in this setting.

Additionally, in some embodiments, if the radiometric response function and corresponding inverse function to be determined are expected to be monotonic functions, the rank minimization module 218 may further include a monotonicity constraint in the objective function in order to avoid obtaining trivial solutions. In one embodiment, the rank minimization module 218 may represent the monotonicity constraint as ∂g/∂D>0, and represent the objection function as:

$$\hat{g} = \mathrm{argmin}_g \mathrm{rank}(A) + \lambda \sum_t H\left(\frac{\partial g(t)}{\partial D}\right) \quad (15)$$

$$\text{s.t. } A = g \circ D$$

where H(•) is a Heaviside step function (H(x)=1 when x≥0, and H(x)=0, otherwise). The rank minimization module 218 may assess the derivatives ∂g(t)/∂D at various t within a range of [0, 1], for example.

Although Heaviside step function is described to be used for representing the monotonicity constraint in the objection function, the rank minimization module 218 may use any other function that may represent and/or enforce monotonicity in the inverse function to be determined.

Additionally or alternatively, prior to determining the inverse function that transforms the observation matrix into a matrix of rank-one or minimal rank, the rank minimization module 218 may further eliminate outliers in the received data of observations or in the observation matrix. The outliers may be present in the received observations or the observation matrix because of noise, systematic discrepancies, etc. In one embodiment, the rank minimization module 218 may employ any conventional filtering method such as a low pass filter to remove any high-frequency noise in the received data of observations. In some embodiments, the rank minimization module 218 may employ a method based on robust PCA (i.e., Principal Component Analysis) algorithm for reliably eliminating the outliers in the data of observations. In one embodiment, the rank minimization module 218 may decompose the observation matrix D into two matrices:

$$D = Z + S \quad (16)$$

where Z is a low-rank matrix and S is a sparse error matrix.

The rank minimization module 218 may obtain a solution of the above equation (16) by solving minimize $\|Z\| + \lambda_S \|S\|$ subject to $Z + S = D$ \quad (17)

where $\lambda_S$ is a regularization weight which may be determined automatically by the system 104 and/or manually by the user 108.

In some embodiments, the rank minimization module 218 may further modify the above robust PCA algorithm to take into account of a low-rank (e.g., rank-one) structure of the observation matrix and/or a low-frequency nature of the response function to be determined. By way of example and not limitation, the rank minimization module 218 may decompose the observation matrix into a rank-one matrix and a high-rank matrix, and apply a threshold to the high-rank matrix to find the outliers. In one embodiment, the rank minimization module 218 may find the outliers based on statistics of the high-rank matrix. The rank minimization module 218 may calculate the statistics of the high-rank matrix based on a predetermined distribution of rank deviations from a rank-one approximation. The predetermined distribution may include, for example, a Gaussian distribution, a normal distribution, etc.

By way of example and not limitation, the rank minimization module 218 may employ an outlier rejection algorithm similar to that described above in Table 1.

In one embodiment, the inverse function $\hat{g}$ may suffer from ambiguities that are specific to the predetermined condition used in obtaining the image(s). For example, an ambiguity or exponential ambiguity may exist when the multiple-exposure setting is used. Specifically, if g is a solution for I=g(M), $g^\gamma$ can also become a solution as $I^\gamma = g^\gamma(M)$ for arbitrary $\gamma$. Recovery of the exposure ratios, for example, and the radiometric response function of the optical device may become impossible without either making assumptions on the radiometric response function or having rough estimates on the exposure ratios.

Without making any assumptions about exposure times, the rank minimization module 218 can robustly recover the radiometric response function of the optical device up to an exponential ambiguity from at least two images. In some embodiments, the response function determination system 104 may further receive one or more known exposure ratios. Using the one or more known exposure ratios, the rank minimization module 218 may estimate $\gamma$ by, for example, solving a least-square problem as described below:

$$\hat{\gamma} = \mathrm{argmin}_\gamma \Sigma_{i,j} [\hat{g}^\gamma(M_i) - r_{i,j} \hat{g}^\gamma(M_j)]^2 \quad (18)$$

where $r_{i,j}$ is an exposure ratio $e_i/e_j$ of measurement pairs $M_i$ and $M_j$.

In some embodiments, the rank minimization module 218 may estimate $\gamma$ using only one known exposure ratio. In that case, the rank minimization module 218 may employ a modified version of the above Equation (18) that is without a summation, for example.

In one embodiment, the rank minimization module 218 may perform the rank minimization and outlier rejection algorithms in an iterative manner to solve the rank minimization problem. By way of example and not limitation, the rank minimization module 218 may employ an algorithm as described in Table 2 for rank minimization. Upon obtaining a solution of the inverse function g, the rank minimization module 218 may resolve an exponential ambiguity $\gamma$ (if exist in a solution in the multiple-exposure setting, for example) after convergence using Equation (18).

TABLE 2

Rank Calibration/Determination
Radiometric Calibration Algorithm

1: Procedure RankCalib(D)
2:   initialize g
3:   while not converged do
4:     A = g ∘ D
5:     Z = OutlierRejection(A, ρ)
6:     calculate error using Equation (15)
7:     update g
8:   end while
9:   return $\hat{g}$
10: end procedure Additionally, in response to determining the inverse function by the rank minimization module 218, the determination module 220 may determine the radiometric response function of the optical device based on the determined inverse function. In one embodiment, the determination module 220 may determine the radiometric response function of the optical device based on the determined inverse function and properties of monotonicity and/or continuity of the radiometric response function.

Upon determining the radiometric response function, the output module 222 of the response function determination system 104 may output a result to the user 108 in a form of visual representation (e.g., displaying a graphical or tabular result on a display connected to the system 104, printing a graph representing the radiometric response function to the user 108, etc.) or a storage form, for example, storing the result in a storage device such as USB drive.

Exemplary Methods

Figure 3:
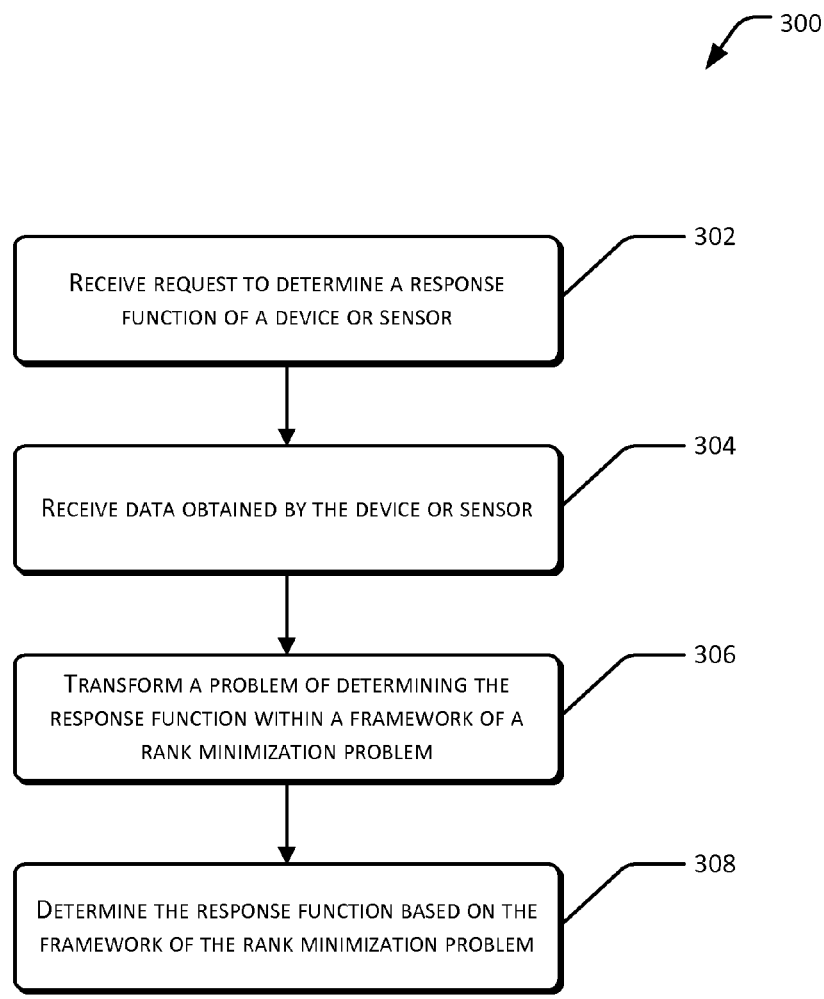
FIG. 3 illustrates an example method of determining a response function.
Figure 4:
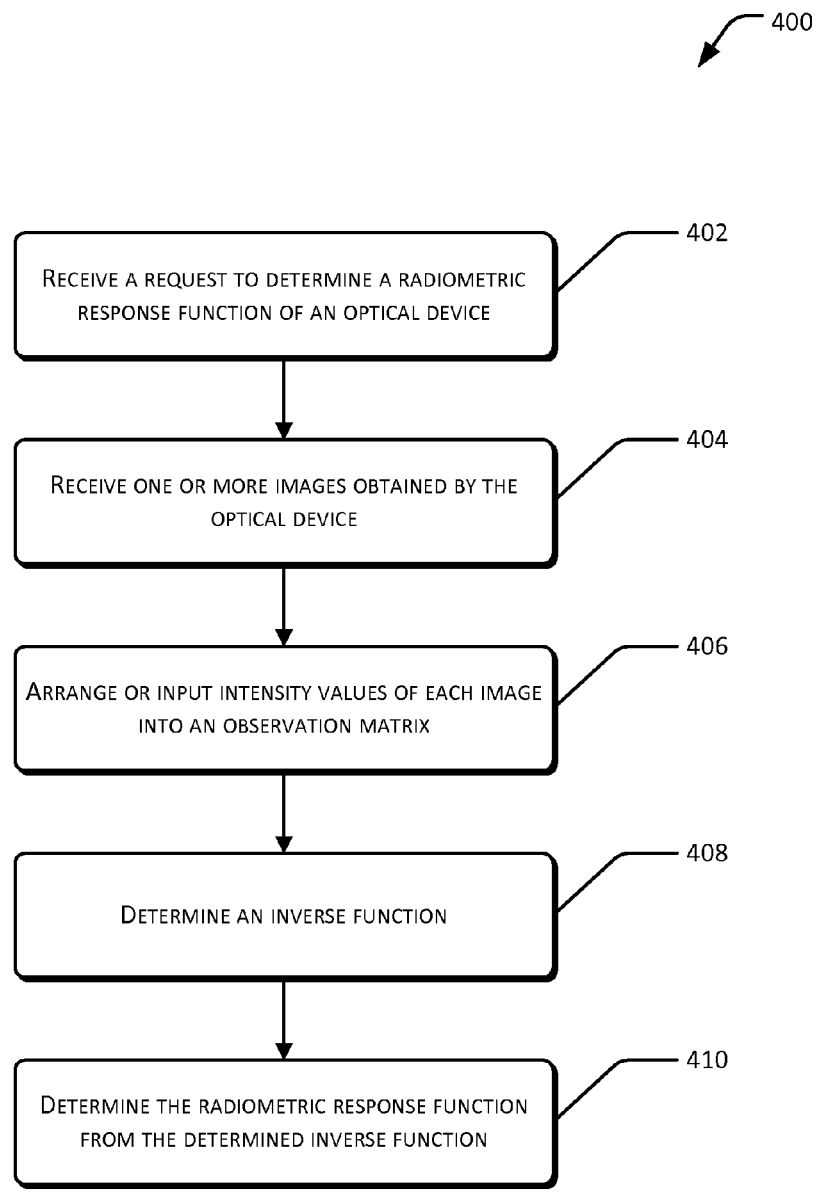
FIG. 4 illustrates an example method of determining a radiometric response function of an optical device.

FIG. 3 is a flow chart depicting an example method 300 of determining a response function of a device or sensor. FIG. 4 is a flow chart depicting an example method 400 of determining a radiometric response function of an optical device. The methods of FIG. 3 and FIG. 4 may, but need not, be implemented in the environment of FIG. 1 and using the system of FIG. 2. For ease of explanation, methods 300 and 400 are described with reference to FIGS. 1 and 2. However, the methods 300 and 400 may alternatively be implemented in other environments and/or using other systems.

Methods 300 and 400 are described in the general context of computer-executable instructions. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations.

Referring back to FIG. 3, at block 302, the system 104 receives a request to determine a response function of a device or a sensor (e.g., the device 102). The device 102 or sensor may include, but is not limited to, an optical device or sensor, an electronic device or sensor, a biochemical device or sensor, and a chemical device or sensor.

At block 304, the system 104 may further receives data that is obtained by the device 102 or sensor. The data that is obtained by the device 102 or sensor may be obtained under a predetermined condition.

At block 306, the system 104 transforms a problem of determining the response function of the device 102 or sensor within a framework of a rank minimization problem.

At block 308, the system 104 determines the response function of the device 102 or sensor based on the framework of the rank minimization problem. For example, the system 104 may determine the response function of the device 102 or sensor within the framework of the rank minimization problem based on the received data from the device 102 or sensor.

Referring back to FIG. 4, at block 402, the system 104 receives a request to determine a radiometric response function of an optical device (e.g., the device 102) or sensor.

At block 404, in response to receiving the request to determine the radiometric response function, the system 104 may further receive one or more images that are obtained by the optical device 102 or sensor under a predetermined condition. The predetermined condition may include, but is not limited to, capturing the one or more images or image frames each with a different exposure time, capturing the one or more images or image frames each with a different illumination; and/or capturing the one or more images or image frames that include irradiance mixtures around respective image edges.

At block 406, in response to receiving the one or more images, the system 104 may arrange or input intensity values of each image into an observation matrix. In one embodiment, the system 104 may arrange the intensity values of each image into the observation matrix in a way that the intensity values of each image exhibit linear dependence with intensity values of other images when transformed by an inverse function, which is inverse to or associated with the radiometric response function of the optical device 102 or sensor to be determined.

At block 408, upon obtaining the observation matrix, the system 104 determines an inverse function that transforms the observation matrix into a matrix of rank one or a matrix of minimal rank. In one embodiment, prior to determining the inverse function, the system 104 may further eliminate outliers in the observation matrix. The outliers may include, for example, a misalignment of the one or more images, a motion in a scene displayed in the one or more images, and/or a shadow displayed in the one or more images.

Additionally or alternatively, prior to determining the inverse function, the system 104 may eliminate the outliers by decomposing the observation matrix into a rank-one matrix and a high-rank matrix which rank is higher than one. The system 104 may subsequently apply a predetermined threshold to the high-rank matrix to eliminate the outliers. By way of example and not limitation, the predetermined threshold may be selected by the system 104 or by the user 108 based on corresponding condition. In one embodiment, the system 104 may select or determine the predetermined threshold based on statistics of the high-rank matrix. In some embodiments, the system 104 may calculate the statistics of the high-rank matrix based on a predetermined distribution of rank deviations from a rank-one approximation. The predetermined distribution may include, but is not limited to, a Gaussian distribution, a normal distribution, and/or any distribution that best models the rank deviations from the rank-one approximation of the response function of the device 102 or sensor to be determined.

At block 410, the system 104 may determine the radiometric response function of the optical device 102 or sensor from the determined inverse function. In one embodiment, the system 104 may obtain the radiometric response function of the optical device 102 or sensor from the determined inverse function based on properties of monotonicity and continuity of the radiometric response function of the optical device 102 or sensor.

Although the above acts are described to be performed by the system 104, one or more acts that are performed by the system 104 may be performed by the device 102 or other software or hardware of the client device 102 and/or any other computing device, and vice versa. For example, the device 102 may include mechanism and/or processing capability to arrange the data (e.g., the data of observations) thereof into a predetermined data format such as a matrix (e.g., the observation matrix as described above). The device 102 may then send this predetermined data format to the system 104 for determination of the response function of the device 102.

Furthermore, the device 102 and the system 104 may cooperate to complete an act that is described to be performed by the response function determination system 104. For example, the device 102 may continuously send data of observations to the system 104 through the network 106. The system 104 may iteratively set up an observation matrix, determine an inverse function and hence determine a response function of the device 102. The system 104 may further include or be attached with a display to allow the user 102 to visually compare the inputs to the device 102 (e.g., scenes to be captured by a camera) with inverse results obtained by applying the determined inverse function to the data of observations (e.g., one or more images obtained by the camera).

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media.

Conclusion

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A method comprising:
under control of one or more processors configured with executable instructions:
receiving a request to determine a response function of an image capture device;
transforming a problem of determining the response function of the image capture device into a framework of a rank minimization problem; and
determining the response function of the image capture device based on the framework of the rank minimization problem.

2. The method of claim 1, further comprising receiving one or more images that are obtained by the image capture device under a predetermined condition.

3. The method of claim 2, wherein the predetermined condition comprises at least one of:
capturing the one or more images each with a different exposure time;
capturing the one or more images each with a different illumination; or
capturing the one or more images that include irradiance mixtures around respective image edges.

4. The method of claim 2, wherein the transforming comprises arranging intensity values of each image into an observation matrix.

5. The method of claim 4, wherein the determining the response function comprises:
determining an inverse function that, when applied to the observation matrix, minimizes a rank of the observation matrix; and
obtaining the response function of the image capture device from the determined inverse function.

6. The method of claim 5, wherein the determining the response function further comprises eliminating outliers in the observation matrix.

7. The method of claim 6, wherein the outliers comprise outliers due to at least one of a misalignment of the one or more images, a motion in a scene displayed in the one or more images, or a shadow displayed in the one or more images.

8. The method of claim 6, wherein the eliminating comprises:
decomposing the observation matrix into a rank-one matrix and a high-rank matrix having a rank higher than one; and
applying a predetermined threshold to the high-rank matrix to eliminate the outliers.

9. The method of claim 8, wherein the eliminating comprises determining the predetermined threshold based on statistics of the high-rank matrix, the statistics of the high-rank matrix being calculated based on Gaussian distribution of rank deviations from a rank-one approximation.

10. The method of claim 5, wherein the obtaining is based on properties of monotonicity and continuity of the response function of the image capture device.

11. The method of claim 4, wherein the arranging comprises inputting the intensity values of each image into a respective vector of the observation matrix.

12. The method of claim 11, wherein the transforming further comprises arranging the respective vector of each image in the observation matrix to exhibit a linear dependence with one another after an inverse function is applied to the observation matrix.

13. One or more computer-readable storage device comprising a memory storing computer-executable instructions that, when executed by one or more processors, configure the one or more processors to perform acts comprising:
receiving input data that is obtained by a device under a predetermined condition; and
determining a response function of the device within a framework of a rank minimization problem based on the received input data.

14. The one or more computer-readable storage device of claim 13, wherein the input data comprises one or more images or one or more image frames of a video.

15. The one or more computer-readable storage device of claim 14, wherein the determining comprises:
arranging intensity values of each image or image frame into an observation matrix;
determining an inverse function that minimizes a rank of the observation matrix; and
obtaining the response function of the device from the determined inverse function.

16. The one or more computer-readable storage device of claim 15, wherein the obtaining is based on properties of monotonicity and continuity of the response function of the device.

17. The one or more computer-readable storage device of claim 15, wherein the arranging further comprises inputting the intensity values of each image or image frame into a respective vector of the observation matrix.

18. The one or more computer-readable storage device of claim 17, wherein the arranging further comprises arranging the respective vector of each image or image frame in the observation matrix to exhibit a linear dependence with one another after the inverse function is applied to the observation matrix.

19. The one or more computer-readable storage device of claim 14, wherein the predetermined condition comprises at least one of:
capturing the one or more images or the one or more image frames each with a different exposure time;
capturing the one or more images or the one or more image frames each with a different illumination; or
capturing the one or more images or the one or more image frames that include irradiance mixtures around respective image or image frame edges.

20. A method comprising:
under control of one or more processors configured with executable instructions:
receiving a request to determine a radiometric response function of an optical device;
receiving one or more images that are obtained by the optical device under a predetermined condition;
arranging intensity values of each image into an observation matrix;
determining an inverse function that minimizes a rank of the observation matrix; and
determining the radiometric response function of the optical device from the determined inverse function.

* * * * *